United States Patent
Bergmeier (10) Patent No.: US 12,114,673 B2
(45) Date of Patent: Oct. 15, 2024

(54) DEVICE AND METHOD FOR CONTROLLING THE TEMPERATURE OF FOODS, IN PARTICULAR EGGS

(71) Applicant: Gerd Bergmeier, Hiddenhausen (DE)

(72) Inventor: Gerd Bergmeier, Hiddenhausen (DE)

( * ) Notice: Subject to any disclaimer, the term of this patent is extended or adjusted under 35 U.S.C. 154(b) by 242 days.

(21) Appl. No.: 17/429,371

(22) PCT Filed: Feb. 3, 2020

(86) PCT No.: PCT/EP2020/052596
§ 371 (c)(1),
(2) Date: Aug. 9, 2021

(87) PCT Pub. No.: WO2020/164944
PCT Pub. Date: Aug. 20, 2020

(65) Prior Publication Data
US 2022/0046962 A1   Feb. 17, 2022

(30) Foreign Application Priority Data
Feb. 11, 2019   (DE) .................. 10 2019 103 312.8

(51) Int. Cl.
*A23B 5/04* (2006.01)
*A23L 3/00* (2006.01)
(Continued)

(52) U.S. Cl.
CPC .............. *A23B 5/04* (2013.01); *A23L 3/001* (2013.01); *A23L 3/361* (2013.01); *B65G 47/5122* (2013.01); *B65G 2201/0208* (2013.01)

(58) Field of Classification Search
CPC ............ B65G 47/5113; B65G 47/5118; B65G 47/5122; B65G 47/5127; B65G 47/5131;
(Continued)

(56) References Cited

U.S. PATENT DOCUMENTS 3,882,686 A * 5/1975 Rose ............... B65G 47/57
426/298
4,168,776 A   9/1979 Hoeboer
(Continued)

FOREIGN PATENT DOCUMENTS

AU   3880272 A   8/1973
CH   704475 A1   8/2012
(Continued)

OTHER PUBLICATIONS

International Search Report mailed Mar. 26, 2020 in related/corresponding International Application No. PCT/EP2020/052596.
(Continued)

*Primary Examiner* — Gene O Crawford
*Assistant Examiner* — Keith R Campbell
(74) *Attorney, Agent, or Firm* — PATENT PORTFOLIO BUILDERS PLLC (57) ABSTRACT

A device for controlling the temperature of foods along a conveying path includes a buffer unit arranged in a region between a loading station and an unloading station. The buffer unit has at least two deflecting rollers. A first deflecting roller engages, in a first portion of a conveying device, in a continuous conveying chain, continuous conveying belt, or the like, which moves from the loading station toward the unloading station when driven. A second deflecting roller engages, in a second portion of a conveying device, in the continuous conveying chain, continuous conveying belt, or the like, which moves from the unloading station toward the loading station when driven. The first drive unit is coupled in the region of the loading station and a second drive unit is coupled in the region of the unloading station to the continuous conveying chain, continuous conveying belt, or the like.

6 Claims, 7 Drawing Sheets

(51) Int. Cl.
*A23L 3/36* (2006.01)
*B65G 47/51* (2006.01)

(58) Field of Classification Search
CPC . B65G 2201/0208; A23L 3/001; A23L 3/361; A23B 5/04
See application file for complete search history.

(56) References Cited

U.S. PATENT DOCUMENTS

| | | | | |
|---|---|---|---|---|
| 4,231,470 | A * | 11/1980 | Parkes | B65G 47/5122 432/239 |
| 6,053,304 | A * | 4/2000 | Biagiotti | B65G 47/5122 198/794 |
| 6,620,449 | B1 | 9/2003 | Peers | |
| 6,640,960 | B1 * | 11/2003 | Spettl | B65G 47/5122 198/347.1 |
| 6,707,014 | B1 * | 3/2004 | Corey | B65G 17/067 219/494 |
| 6,758,321 | B2 * | 7/2004 | Spettl | B65G 47/5122 198/347.1 |
| 8,490,772 | B2 * | 7/2013 | Michler | B65G 47/5122 198/347.1 |
| 8,979,619 | B2 | 3/2015 | Lang | |
| 9,132,962 | B2 * | 9/2015 | Cicalini | B65G 17/126 |
| 10,214,356 | B2 | 2/2019 | Bergmeier | |
| 2003/0234601 | A1 | 12/2003 | Spettl | |
| 2012/0061204 | A1 | 3/2012 | Philipp | |
| 2012/0163944 | A1 | 6/2012 | Michler et al. | |
| 2020/0399062 | A1 | 12/2020 | Philipp | |

FOREIGN PATENT DOCUMENTS

| | | |
|---|---|---|
| DE | 2206148 A | 8/1972 |
| DE | 69705184 T2 | 3/2002 |
| DE | 102012010845 A1 | 12/2013 |
| EP | 0406658 A1 | 1/1991 |
| JP | S5461782 | 5/1979 |
| JP | 2002531150 A | 9/2002 |
| JP | 2017512165 A | 5/2017 |
| WO | 2016118967 A1 | 7/2016 |
| WO | 2019122335 A1 | 6/2019 |

OTHER PUBLICATIONS

Search Report created Jan. 8, 2020 in related/corresponding DE Application No. 10 2019 103 312.8.
Written Opinion mailed Mar. 26, 2020 in related/corresponding International Application No. PCT/EP2020/052596.
Office Action dated Oct. 25, 2023 in related/corresponding JP Application No. 2021-546852.

* cited by examiner

DEVICE AND METHOD FOR CONTROLLING THE TEMPERATURE OF FOODS, IN PARTICULAR EGGS

BACKGROUND AND SUMMARY OF THE INVENTION

Exemplary embodiments of the present invention relate to a device for controlling the temperature of foodstuffs, in particular eggs, along a conveying path and to a method for controlling the temperature of foodstuffs, in particular eggs, using such a device.

Such temperature-control devices, in particular cooling devices, are required to cool foodstuffs, in particular eggs, for example, after prior cooking or pasteurization, or in other applications to heat them to a predetermined temperature.

The foodstuffs are conveyed along a meandering conveying path through a conveyor. The conveyor is surrounded by a housing on which one or more temperature-control units are arranged to control the temperature of the conveying space. The meandering conveying path serves primarily to limit the length of the conveying path and the housing required to enclose it to a suitable dimension.

A disadvantage of the known devices is that in the event of a malfunction, the entire conveyor device usually has to be stopped in order to rectify the fault and only then can the conveyor device be put back into operation.

A particular disadvantage here is that the feeding of the foodstuffs to the conveyor device and also the emptying and subsequent further treatment steps of the foodstuffs that take place after emptying also come to a standstill.

Exemplary embodiments of the present invention are directed to a device for controlling the temperature of foodstuffs, in particular eggs, along a conveying path in such a way that in particular the filling of the conveyor device with the foodstuffs does not have to be interrupted even in the event of a malfunction.

Exemplary embodiments of the present invention are also directed to a method for controlling the temperature of foodstuffs, in particular eggs, which can continue to be operated even in the event of a malfunction.

The device according to the invention for controlling the temperature of foodstuffs, in particular eggs, along a conveying path, comprises a conveyor device having at least one endless conveyor chain, belt, or the like driven by a first drive unit, which, guided along a plurality of deflection rollers rotatably fixed to a frame, defines a meandering conveying path.

The device further comprises a plurality of holding devices disposed on the endless conveyor chain, belt, or the like for holding the foodstuffs.

Connected to the conveyor device is a loading station at which the holding devices can be loaded with the foodstuffs and an unloading station at which the foodstuffs can be removed from the holding devices. The device also comprises at least one temperature-control unit, fixed to a housing at least partially enclosing a conveying space, for controlling the temperature of the conveying space, through which the foodstuffs are conveyed along the conveying path during operation.

In an area between the loading station and the unloading station, a buffer unit is arranged which comprises at least two deflection rollers.

In this regard, a first deflection roller engages a first portion of the conveyor device in the endless conveyor chain, belt, or the like which, when driven, moves from the loading station toward the unloading station and wherein a second deflection roller engages a second portion of the conveyor in the endless conveyor chain, belt, or the like which, when driven, moves from the unloading station toward the loading station.

The first drive unit is coupled to the endless conveyor chain, belt, or the like in the area of the loading station, while the second drive unit is coupled to the endless conveyor chain, belt, or the like in the area of the unloading station.

With a device designed in this way, it is possible to continue loading the holding devices with foodstuffs even in the event of a malfunction, while at the same time the second portion of the conveyor device with a stationary endless conveyor chain, belt or the like is at a standstill.

In addition, a device designed in this way makes it possible to specifically influence the dwell time of the foodstuffs in the device and thereby control the temperature-control time of the food in the device.

In this way, for example, an energy-intensive temperature increase or decrease to achieve the desired temperature of the foodstuffs, depending on the size or volume of the foodstuffs to be tempered, can be replaced by extending or shortening the dwell time of the foodstuffs in the device.

According to an advantageous embodiment variant of the invention, the buffer unit is designed as a carriage that is arranged to be movable along a guide web fixed to the frame, wherein the at least two deflection ropers are rotatably attached to a mounting plate of the carriage.

The carriage with the two deflection rollers arranged on it enables guiding of the endless conveyor chain, belt, or the like in any operating condition.

According to an advantageous further development, the buffer unit has four deflection rollers rotatably attached to the mounting plate of the carriage, wherein two upper deflection ropers engage the endless conveyor chain, belt, or the like in the first portion of the conveyor device and two lower deflection rollers engage the endless conveyor chain, belt, or the like in the second portion of the conveyor device.

This embodiment variant allows the buffer area to be increased, thus enabling the second portion of the conveyor device to be stopped for a longer period of time, allowing more time to correct the fault without having to bring the conveyor device to a complete stop.

According to a further embodiment variant, each of the holding devices comprises a rod pivotally attachable to the endless conveyor chain, belt, or the like, on which a plurality of support elements aligned parallel and per to the longitudinal axis of the rod are arranged.

This makes it possible to position several eggs (or other foodstuffs) next to each other on the holding device on such a rod.

According to a further advantageous further development, the conveyor device comprises two endless conveyor chains, belts, or the like arranged parallel to and spaced apart from one another, which are coupled to the first drive unit and the second drive unit.

The provision of such endless conveyor chains arranged parallel to and spaced apart from one another enables even better retention of the holding devices, which in the case of two endless conveyor chains arranged parallel to and spaced apart from one another can be attached at their respective ends to the respective endless conveyor chain.

Depending on the mass of the foodstuffs to be transported and the width of the conveying direction, it is also conceivable to arrange more than two such endless conveyor chains spaced parallel to each other.

According to a further advantageous embodiment variant, the loading station has at least two deflection rollers arranged one above the other on a vertically aligned lifting rod, which can be moved in a vertically oscillating manner, via which deflection rollers the endless conveyor chain, belt, or the like is guided, wherein the oscillating movement of the lifting rod and the speed of the endless conveyor chain, belt, or the like are coordinated with one another during operation in such a way that the holding devices are stationary for loading for a predetermined loading period.

With such a loading station, an easy-to-perform loading of the conveyor device with foodstuffs, in particular eggs, is made possible.

According to an advantageous further development, the lifting rod is coupled to the first drive unit and can thus be precisely matched to the speed of the endless conveyor chain in terms of its oscillating movement, for example via a suitable gear ratio.

In the method according to the invention for controlling the temperature, in particular the cooling, of foodstuffs, in particular eggs, with a device as described above, both drive units are operated in a first operating state in such a way that the at least one endless conveyor chain, belt, or the like is driven at the same first operating speed.

In a second operating state, the first drive unit drives the first portion of the endless conveyor chain, belt, or the like at the first operating speed, while the second drive unit and thus also the second portion of the endless conveyor chain, belt or the like is stationary, in which operating state the buffer unit is moved from an initial position towards a maximum buffer position.

In a third operating state, the first drive unit drives the first portion of the endless conveyor chain, belt, or the like at the first operating speed, while the second drive unit drives the second portion of the endless conveyor chain, belt, or the like at a second, higher operating speed, in which operating state the buffer unit is moved from a position moved toward the maximum buffer position back toward the initial position.

Such a method allows the conveyor to be loaded even in the event of a malfunction.

As soon as the malfunction has been rectified, the foodstuffs stored in the meantime in the buffer area of the conveyor can be gradually transferred back to the conveying path of normal operation by appropriate control of the second drive unit, so that a complete shutdown of the conveyor can be avoided.

BRIEF DESCRIPTION OF THE DRAWING FIGURES

Exemplary embodiments are explained in more detail below with reference to the accompanying drawings, wherein.

DETAILED DESCRIPTION

In the following description of figures, terms such as top, bottom, left, right, front, rear, etc. refer exclusively to the exemplary representation and position of the conveyor device, endless conveyor chain, frame, deflection rollers, holding devices, loading stations, unloading station and the like selected in the respective figures. These terms are not to be understood restrictively, i.e., due to different working positions or the mirror-symmetrical design or the like, these references may change.

Figure 1:
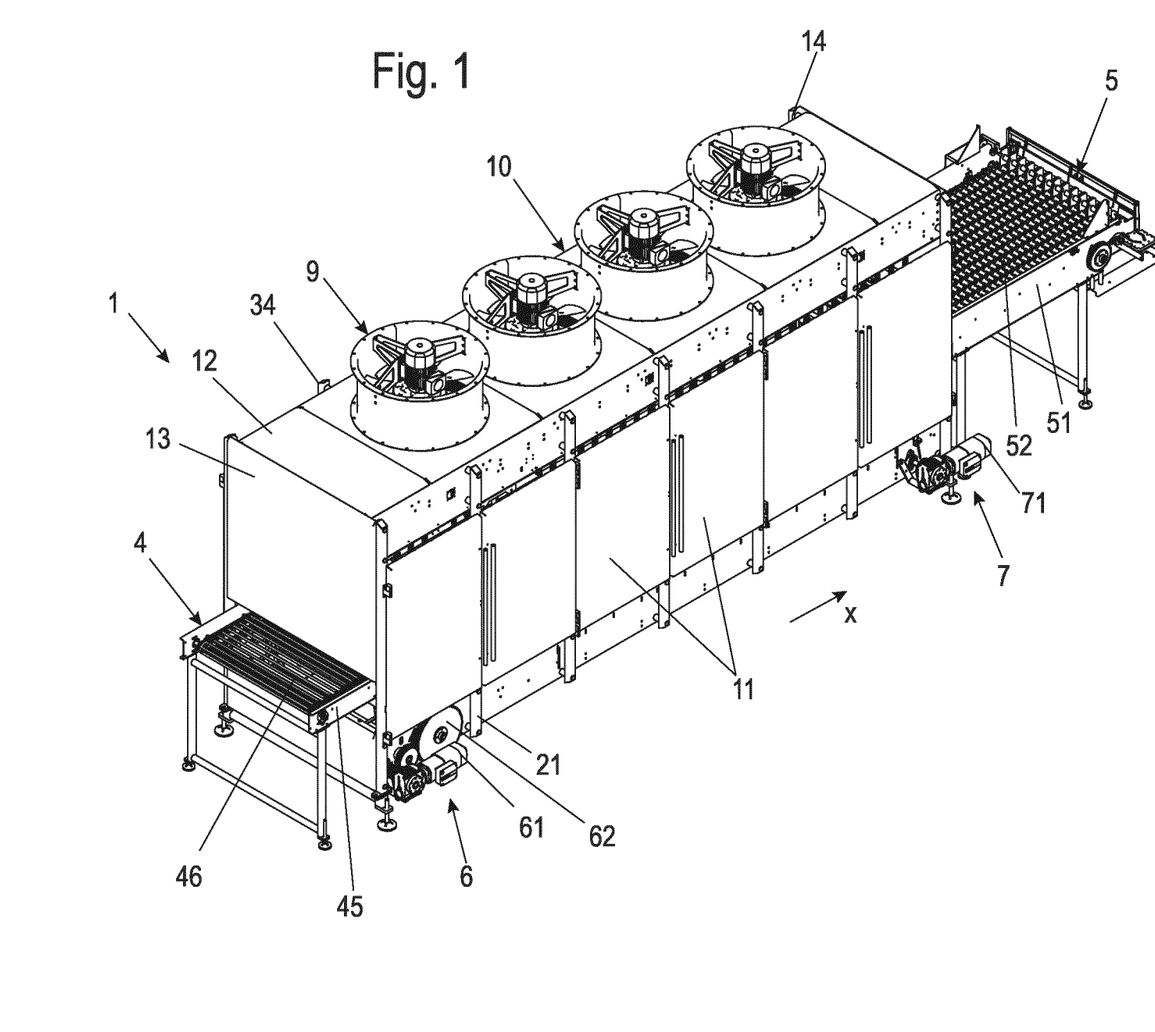
FIG. 1 shows a schematic perspective view of an embodiment variant of a device according to the invention.

In FIG. 1, the reference sign 1 denotes an embodiment variant of a device according to the invention for controlling the temperature of foodstuffs, in particular eggs 15, along a conveying path.

Figure 2:
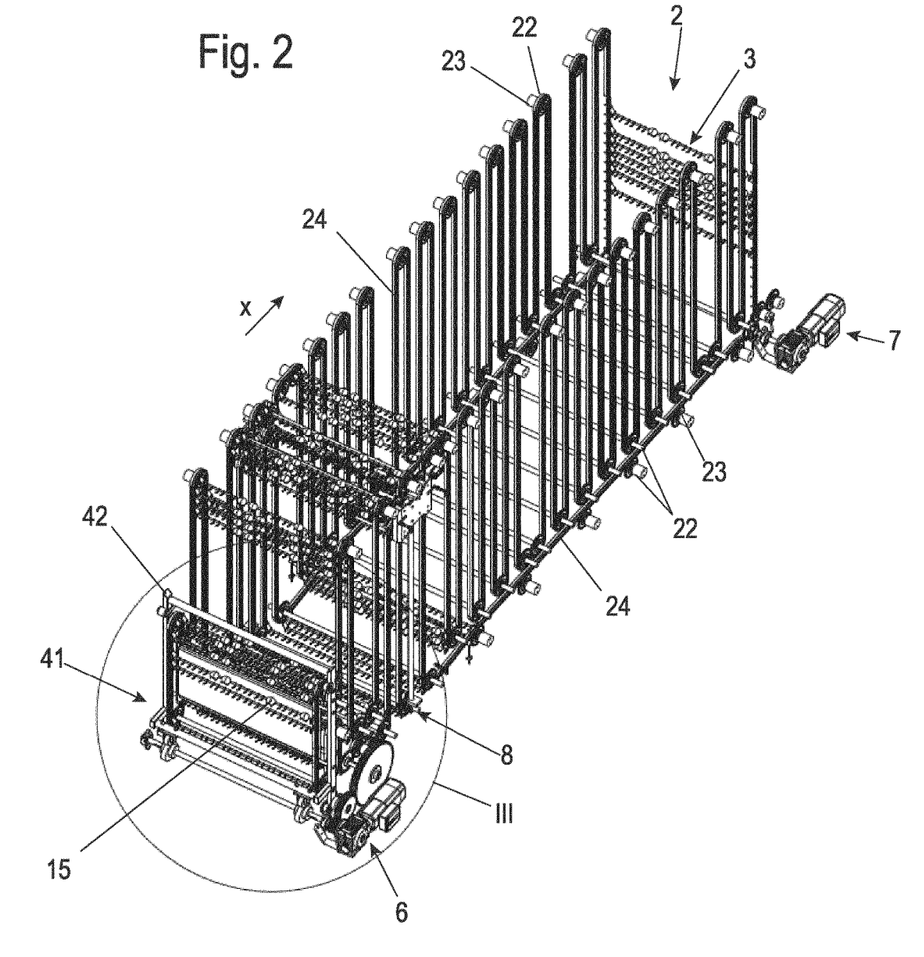
FIG. 2 shows a perspective view of the conveyor device without showing the housing and the frame.
Figure 4:
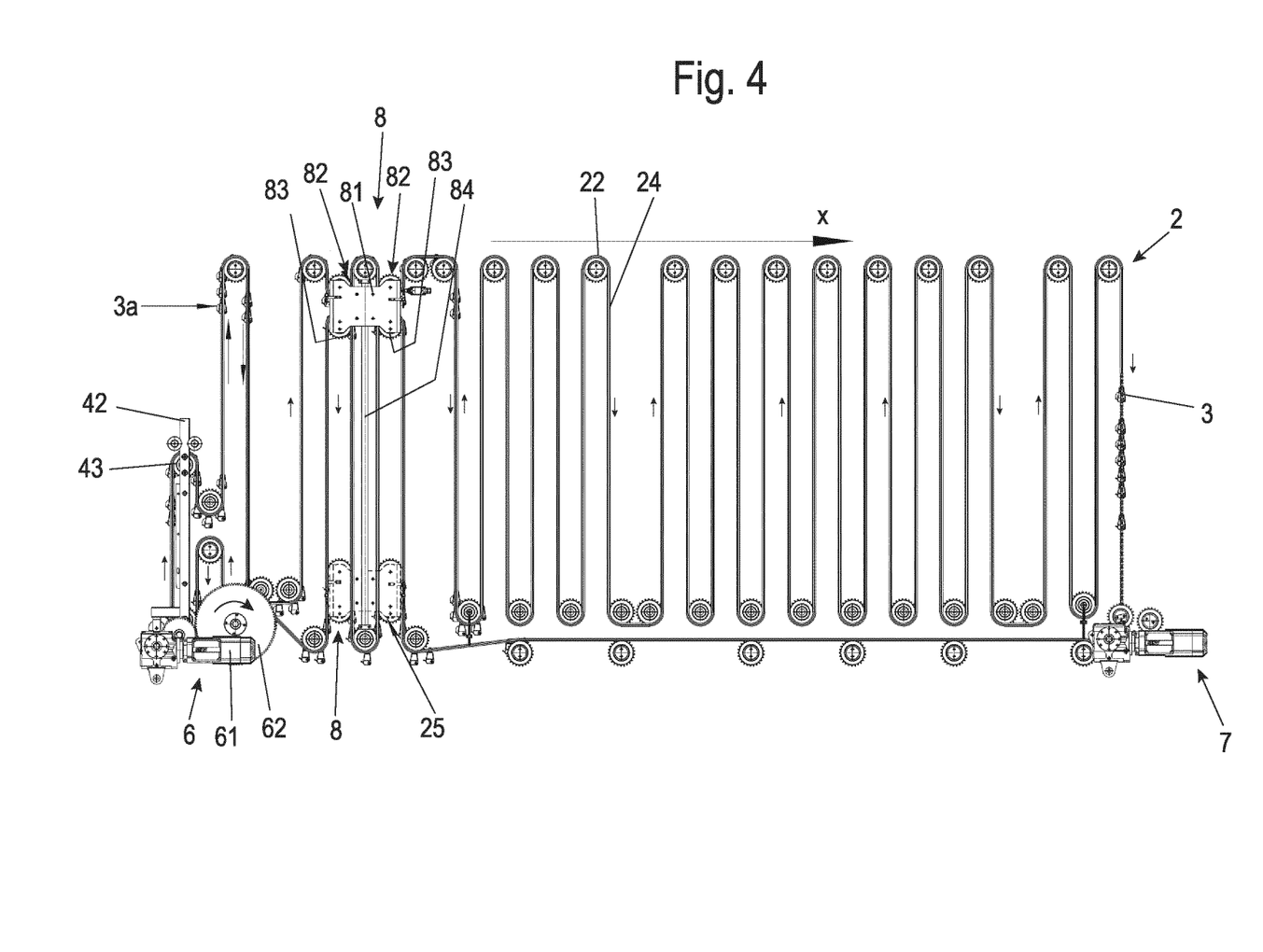
FIG. 4 shows a schematic side view of the conveyor device shown in FIG. 2, showing the buffer unit in an initial position and a maximum buffer position.
Figure 5:
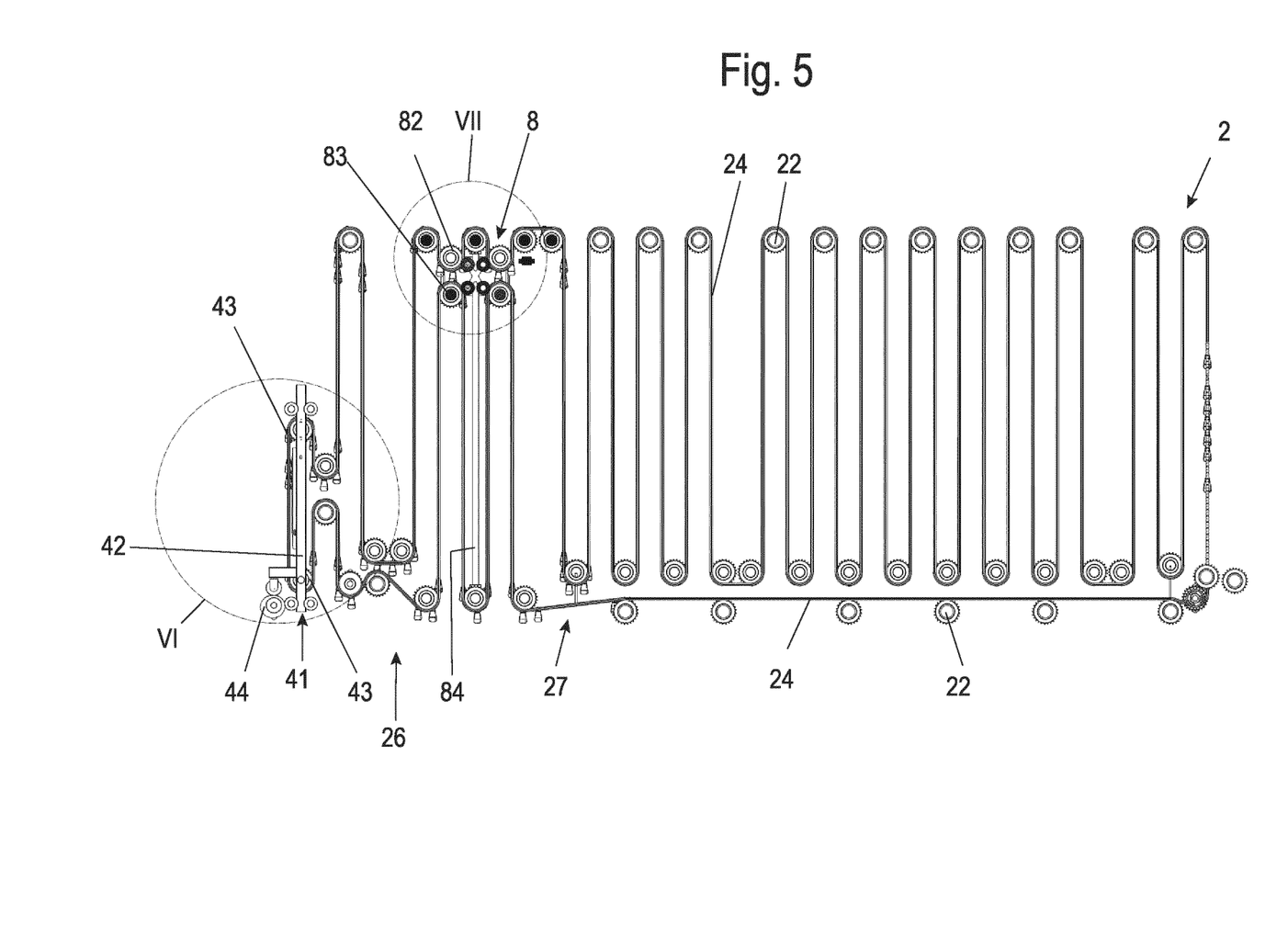
FIG. 5 shows a representation of the conveyor device corresponding to FIG. 4 with the mounting plate of the buffer unit omitted and the drive units omitted.

Device 1 comprises a conveyor device 2 shown in FIGS. 2, 4 and 5, along which the foodstuffs, in particular eggs 15, are conveyed from a loading station 4 to an unloading station 5. On this conveying path, the eggs 15 are preferably conveyed for cooling along the conveying path, which is meander-shaped in this case. The meandering shape of the conveying path allows a predetermined dwell time of the eggs 15 in the conveyor device 2.

The conveyor device 2 has two endless conveyor chains 24 driven by a first drive unit 6, which are guided along a plurality of deflection rollers 22 rotatably fixed to a frame 21 and thus define the meandering conveyor path.

It is also conceivable to use a conveyor belt, rope, or the like instead of the endless conveyor chain 24. In the further description, the embodiment variant shown here with the endless conveyor chain 24 is always described for simplification.

A plurality of holding devices 3 for holding the foodstuffs, here in the form of eggs 15, are arranged on this endless conveyor chain 24. The holding devices 3 have, as can be seen clearly in FIG. 3, a rod 31 which can be pivotally attached to the endless conveyor chain 24 and on which a plurality of support elements 32 are arranged, aligned parallel and perpendicular to the longitudinal axis of the rod.

Figure 3:
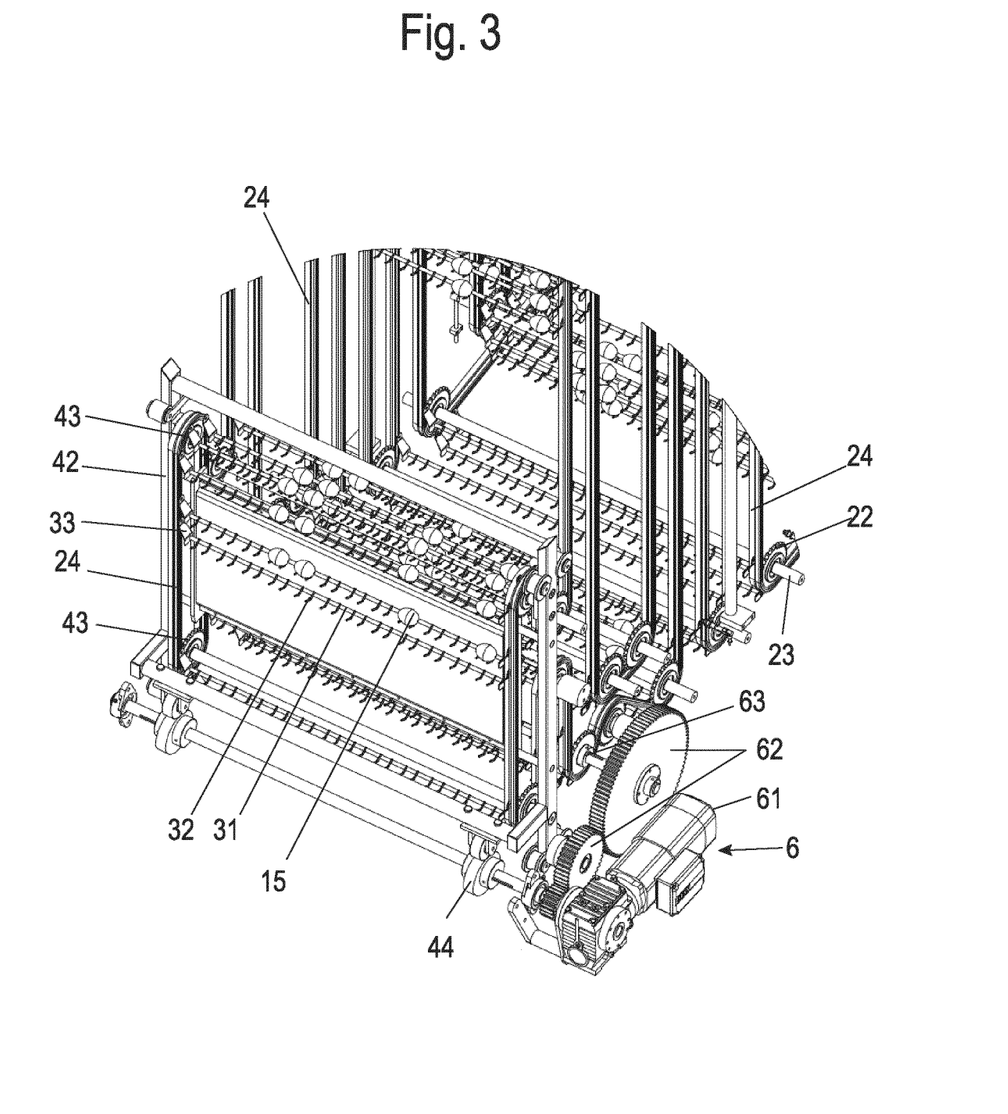
FIG. 3 shows a detailed perspective view of the area of the conveyor device marked III in FIG. 2.

The support elements 32 are here in the form of slightly bent wire pins, which are attached to the rod 31 at such a distance from each other that two such support elements 32 each carry an egg 15.

The embodiment as wire-shaped support elements 32 has the advantage that, on the one hand, the eggs 15 are held securely on the support elements 32 and, on the other hand, they rest on the support elements 32 with a very small contact area in order to ensure sufficient coding of the eggs 15.

The rods 31 are hooked into the endless conveyor chain 24 via coupling pieces 33 attached to their ends, so that when a section of the endless conveyor chain 24 passes over one of the deflection rollers 22, the rods 31 attached to the coupling piece 33 are always aligned so that the eggs 15 are securely held on the support elements 32.

The conveyor device 2 is further enclosed, as shown in FIG. 1, by a housing 10 having side walls 11, cover walls 12, and a front in a rear wall 13.

One or more temperature-control units 9, in this case in the form of cooling fans, are fitted in the area of the cover wall 12 to ensure that a predetermined temperature prevails within the conveying space 25.

As further shown in FIG. 1, the conveyor device 2 is preceded by a loading station 4 at which the holding devices 3 can be loaded with the foodstuffs.

At the end of the conveying path, in a rear area of the conveyor device 2, an unloading station 5 is accordingly arranged, at which the foodstuffs can be removed from the holding devices 3.

As shown in FIGS. 2, 4, 5 and 7, a buffer unit 8 is arranged on the conveyor device 2 in an area between the loading station 4 and the unloading station 5.

Figure 7:
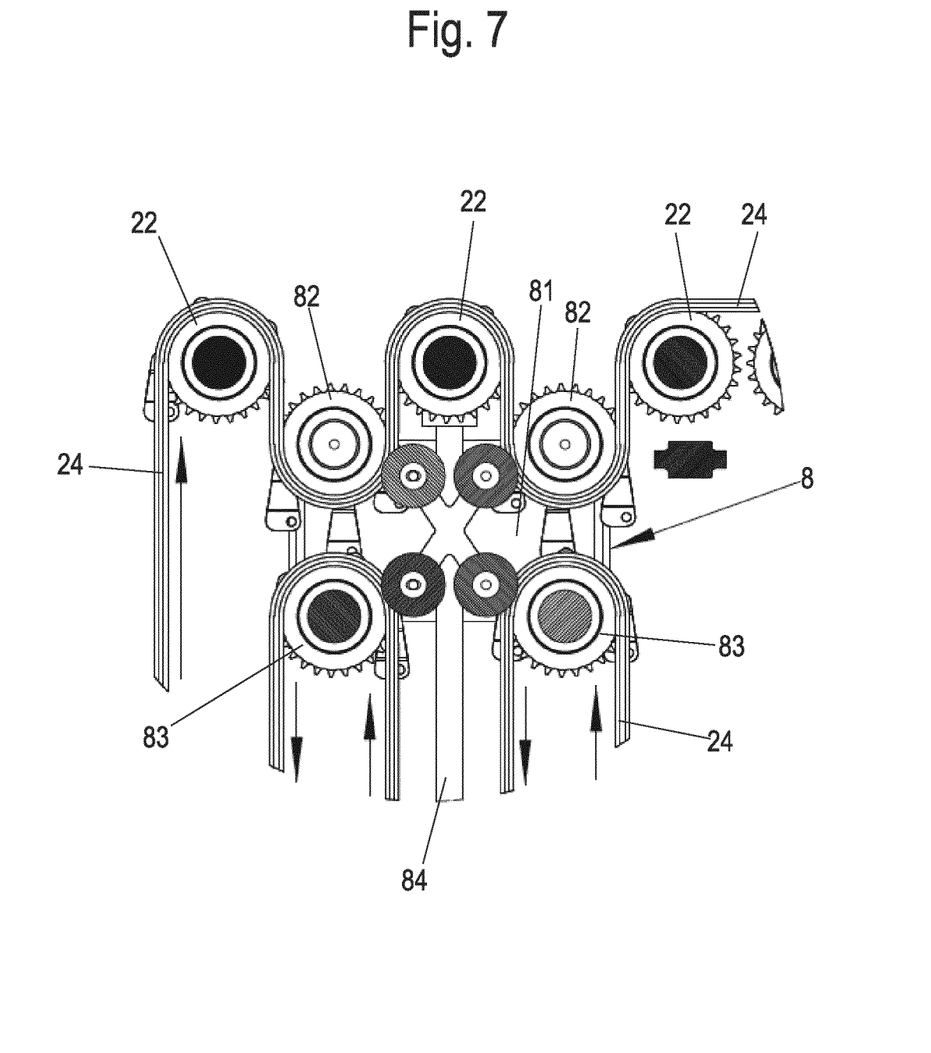
FIG. 7 shows a detailed representation of the buffer unit.

This buffer unit 8 comprises at least two deflection rollers 82, 83, in the embodiment shown four such deflection rollers 82, 83.

In this case, a first deflection roper 82 or, in the embodiment variant shown here, two such first deflection rollers 82 engage in a first portion 26 of the conveyor device 2 in the endless conveyor chain 24, which, in the driven state, moves from the loading station 4 in the direction of the unloading station 5.

A second deflection roller 83, in the exemplary embodiment shown here two such second deflection rollers 83 engage in a second portion 27 of the conveyor device 2 with the endless conveyor chain 24, which in the driven state moves from the unloading station 5 in the direction of the loading station 4.

In this case, as shown in FIG. 4, a first drive unit 6 is coupled to the endless conveyor chain 24 in the area of the loading station 4 and a second drive unit 7 is coupled to the endless conveyor chain 24 in the area of the unloading station 5.

Thus, the above-mentioned first portion 26 of the conveyor device 2 is driven by the first drive unit 6, while the second portion 27 of the conveyor device 2 is driven by the second drive unit 7.

The buffer unit 8 is preferably designed as a carriage that can be moved along a guide web 84 fixed to the frame 21. The at least two deflection rollers 82, 83, in the exemplary embodiment shown four deflection rollers 82, 83, are rotatably mounted on a mounting plate 81 of the carriage. The mode of operation of this buffer unit 8 is described in detail below.

Figure 6:
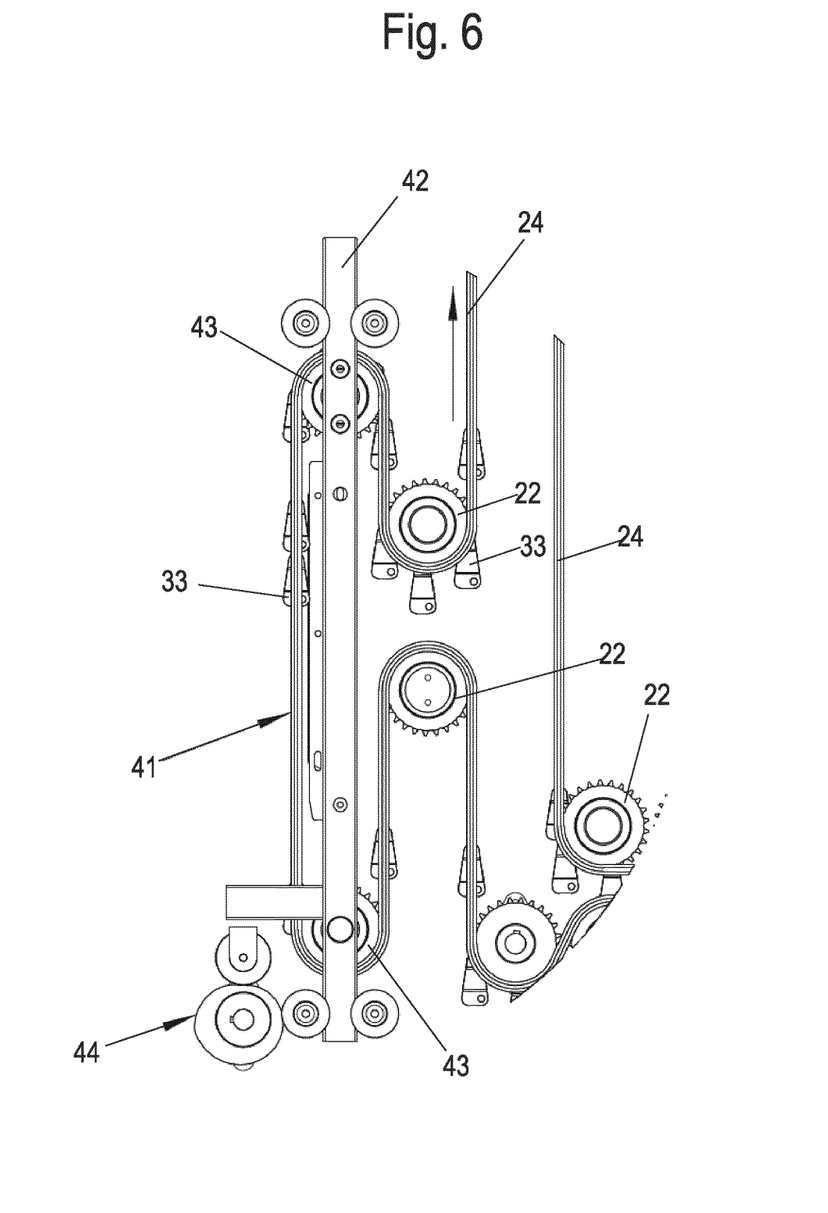
FIG. 6 shows a detailed view of the section marked VI in FIG. 5.

As shown in FIGS. 3 and 6, the loading station 4 has at least two deflection rollers 43 arranged one above the other on a vertically aligned lifting rod 42, which is movable in a vertically oscillating manner. The endless conveyor chain 24 is guided via these deflection rollers 43.

The oscillating movement of the lifting rod 42 and the speed of the endless conveyor chain 24 are coordinated with each other during operation in such a way that the holding devices 3 are stationary for loading for a predetermined loading period.

For this purpose, in the exemplary embodiment considered here, eggs can be transferred to an infeed frame 41 of the loading station 4 by a feed belt 46, which is coupled at a suitable height to an infeed frame 41 on a pick-up table 45.

The oscillating movement of the lifting rod 42 thus causes the entire infeed frame 41 to move up and down in a permanently oscillating manner, so that at the moment of transfer of the eggs, this up and down movement of the infeed frame 41 produces a relative standstill of the support elements 32 relative to the infeed frame 41.

The lifting rod 42 is preferably coupled to the first drive unit 6 via a connecting rod 44.

The drive unit 6 has a motor 61 and a pinion driven by the latter, which in the embodiment variant shown here, for example shown in FIG. 3, meshes with a first gearwheel 62, which in turn meshes with a further gearwheel 62, so that a transmission ratio of the pinion takes place via the gearwheels 62, for example in the ratio 1:5.

In the following, the method according to the invention for controlling the temperature, in particular cooling, of foodstuffs, in particular eggs 15, with the device 1 shown in the figures is described.

In a first operating state, which describes the normal operation of the device, both drive units 6, 7 are operated in such a way that the endless conveyor chains 24 are driven at the same first operating speed $v_1$.

If the first drive unit 6 is designed with a gear ratio, as described above, in contrast to the second drive unit 7, the motor 71 of the second drive unit 7 rotates at a significantly lower speed in accordance with the gear ratio.

This uniform drive causes the endless conveyor chain 24 to move without interruption with the holding devices pivotably held on it.

The buffer unit 8 is held in an initial position, as exemplified in FIG. 2, due to the equal speed of the two portions of the endless conveyor chain 24.

In this first operating state, the eggs 15 are transported along the meandering conveying path from the loading station 4 towards the unloading station 5, where they are transferred to a continuing belt 52 arranged on a pick-up table 51 of the unloading station 5.

If a fault occurs, for example in the area of the unloading station 5, the second drive unit 7 is switched to a second operating state.

In this second operating state, the first drive unit 6 continues to drive the first portion of the endless conveyor chain 24 at the first operating speed $v_1$.

The second drive unit 7 and thus also the second portion of the endless conveyor chain 24 is stopped. As a result, in this second operating state the buffer unit 8 is moved from an initial position shown as an example in FIG. 2 toward a maximum buffer position shown in FIG. 4.

The maximum buffer position of the buffer unit 8 represents the positioning of the buffer unit 8 in the vertically lower area, close to the first drive unit 6 of FIG. 4.

This allows eggs 15 to still be transferred to the conveyor device 2 via the loading station 4. However, due to the standstill of the rear area of the conveyor device 2, no eggs can be emptied from the conveyor device 2 in the area of the unloading station 5. By moving the buffer unit 8 (downward in FIG. 4), a large number of eggs 15 can be received in this buffer area.

As soon as the malfunction is eliminated, the second drive unit 7 is switched to a third operating state. In this third operating state, the first drive unit 6 continues to drive the first portion of the endless conveyor chain 24 at the first operating speed $v_1$, while the second drive unit 7 drives the second portion of the endless conveyor chain 24 at a second, higher operating speed $V_2$, which has the effect that in this operating state the buffer unit 8 is moved from a position in the direction of the maximum buffer position back in the direction of the initial position.

As soon as the buffer unit 8 has then reached its initial position again, the second drive unit 7 is switched back to the first operating state.

In the event that such a malfunction lasts longer than the buffer unit 8 needs to reach the maximum buffer position, the first drive is also switched off.

As soon as the fault is eliminated, the drive units 6, 7 are first switched to the third operating state described above, so that the carriage of the buffer unit 8 is moved back to its initial position and, after reaching the initial position, the drive unit 7 is switched hack to the first operating state.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and theft legal equivalents, such as further explanations in the description.

LIST OF REFERENCE SIGNS

1 Device
2 Conveyor device
21 Frame
22 Deflection roller
23 Wheel axle
24 Endless conveyor chain
25 Conveying space
26 First portion
27 Second portion
3 Holding device
31 Bar
32 Support element
33 Coupling piece
4 Loading station
41 Infeed frame
42 Lifting rod
43 Deflection roller
44 Connecting rod
45 Pick-up table
46 Feed belt
5 Unloading station
51 Pick-up table
52 Belt
6 First drive unit
61 Motor
62 Gearwheel
63 Drive rod
7 Second drive unit
71 Motor
72 Drive rod
8 Buffer unit
81 Mounting plate
82 First deflection roller
83 Second deflection roller
84 Guide web
9 Temperature-control unit
10 Housing
11 Side wall
12 Cover wall
13 Front or rear wall
14 Strut
15 Egg
X Conveying direction
$v_1$ First operating speed
$v_2$ Second operating speed

The invention claimed is:

1. A device for controlling a temperature of foodstuffs along a conveying path, the device comprising:
a conveyor device having at least one endless conveyor chain or belt driven by a first drive unit, wherein the at least one endless chain or belt is guided along a plurality of deflection rollers rotatably fixed to a frame over a meandering conveyor path;
a plurality of holding devices are arranged on the at least one endless conveyor chain or belt and configured to hold the foodstuffs;
a loading station at which the plurality of holding devices are loaded with the foodstuffs;
an unloading station at which the foodstuffs are removed from the plurality of holding devices;
at least one temperature-control unit, fixed to a housing at least partially enclosing a conveying space, wherein the at least one temperature-control unit controls a temperature of the conveying space through which the foodstuffs are conveyed along the meandering conveyor path during operation; and
a buffer unit arranged in a region between the loading station and the unloading station, wherein the buffer unit comprises at least two deflection rollers,
wherein a first deflection roller of the at least two deflection rollers engages, in a first portion of the at least one endless conveyor chain or belt which, in a driven state, moves from the loading station toward the unloading station,
wherein a second deflection roller of the at least two deflection rollers engages, in a second portion of the at least one endless conveyor chain or belt, which, in the driven state, moves from the unloading station towards the loading station,
wherein the first drive unit is coupled to the at least one endless conveyor chain or belt in a region of the loading station and a second drive unit is coupled to the at least one endless conveyor chain or belt in a region of the unloading station, and wherein the buffer unit is a carriage, which is arranged to be movable along a guide web fixed to the frame, and wherein the at least two deflection rollers are rotatably attached to a mounting plate of the carriage, and
wherein the loading station has at least two deflection rollers arranged one above the other on a vertically aligned lifting rod that is moveable in a vertically oscillating manner and via which the at least one endless conveyor chain or belt is guided, wherein the oscillating movement of the vertically aligned lifting rod and a speed of the at least one endless conveyor chain or belt are coordinated with one another in operation in such a way that the plurality of holding devices are stationary for a predetermined loading period for loading.

2. The device of claim 1, wherein the buffer unit comprises four deflection rollers rotatably attached to the mounting plate of the carriage, wherein two upper deflection rollers of the four deflection rollers engage the at least one endless conveyor chain or belt in the first portion of the at least one endless conveyor chain or belt and two lower deflection rollers of the four deflection rollers engage the at least one endless conveyor chain or belt in the second portion of the at least one endless conveyor chain or belt.

3. The device of claim 1, wherein each of the plurality of holding devices comprises a rod pivotally attachable to the at least one endless conveyor chain or belt, and a plurality of support elements aligned parallel and perpendicular to a longitudinal axis of the rod are arranged on the rod.

4. The device of claim 1, wherein the at least one endless conveyor chain or belt comprises two endless conveying chains or belts arranged parallel to and spaced apart from each other and coupled to the first and second drive units.

5. The device of claim 1, wherein the vertically aligned the lifting rod is coupled to the first drive unit.

6. A method for controlling a temperature of foodstuffs using a device comprising a conveyor device having at least one endless conveyor chain or belt driven by a first drive unit, wherein the at least one endless chain or belt is guided along a plurality of deflection rollers rotatably fixed to a frame over a meandering conveyor path, a plurality of holding devices are arranged on the at least one endless conveyor chain or belt and configured to hold the foodstuffs, a loading station at which the plurality of holding devices are loaded with the foodstuffs, an unloading station at which the foodstuffs are removed from the plurality of holding devices, at least one temperature-control unit, fixed to a housing at least partially enclosing a conveying space, wherein the at least one temperature-control unit controls a temperature of the conveying space through which the foodstuffs are conveyed along the meandering conveyor path during operation, a buffer unit arranged in a region between the loading station and the unloading station, wherein the buffer unit comprises at least two deflection rollers, wherein a first deflection roller of the at least two deflection rollers engages, in a first portion of the at least one endless conveyor chain or belt which, in a driven state, moves from the loading station toward the unloading station, wherein a second deflection roller of the at least two deflection rollers engages, in a second portion of the at least one endless conveyor chain or belt, which, in the driven state, moves from the unloading station towards the loading station, and wherein the first drive unit is coupled to the at least one endless conveyor chain or belt in a region of the loading station and a second drive unit is coupled to the at least one endless conveyor chain or belt in a region of the unloading station, the method comprising:

operating the device in a first operating state by operating the first and second drive units in such a way that the at least one endless conveyor chain or belt is driven at a same first operating speed;

operating the device in a second operating state by operating the first drive unit to drive the first portion of the at least one endless conveyor chain or belt at the first operating speed while the second drive unit and the second portion of the at least one endless conveyor chain or belt is stationary, wherein, in the second operating state, the buffer unit is moved from an initial position towards a maximum buffer position; and     operating the device in a third operating state by operating the first drive unit to drive the first portion of the at least one endless conveyor chain or belt at the first operating speed, while the second drive unit drives the second portion of the at least one endless conveyor chain or belt at a second operating speed, which is higher than the first operating speed, wherein in the third operating state the buffer unit is moved from a position moved in the direction of the maximum buffer position back in a direction of the initial position,     wherein the buffer unit is a carriage, which is arranged to be movable along a guide web fixed to the frame, and wherein the at least two deflection rollers are rotatably attached to a mounting plate of the carriage.

\* \* \* \* \*